United States Patent
Simcik et al.

(10) Patent No.: US 10,640,329 B2
(45) Date of Patent: May 5, 2020

(54) REASSIGNMENT OF ELEVATORS FOR MOBILE DEVICE USERS

(71) Applicant: Otis Elevator Company, Farmington, CT (US)

(72) Inventors: Paul A. Simcik, Southington, CT (US); Bradley Armand Scoville, Farmington, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 347 days.

(21) Appl. No.: 15/613,861

(22) Filed: Jun. 5, 2017

(65) Prior Publication Data
US 2018/0346282 A1    Dec. 6, 2018

(51) Int. Cl.
| | |
|---|---|
| *B66B 1/52* | (2006.01) |
| *B66B 1/34* | (2006.01) |
| *B66B 1/46* | (2006.01) |
| *B66B 3/00* | (2006.01) |
| *H04W 4/02* | (2018.01) |

(52) U.S. Cl.
CPC ............ *B66B 1/3461* (2013.01); *B66B 1/468* (2013.01); *B66B 3/006* (2013.01); *H04W 4/023* (2013.01); *B66B 2201/4615* (2013.01); *B66B 2201/4653* (2013.01)

(58) Field of Classification Search
CPC .............. B66B 1/468; B66B 1/3461; B66B 2201/4653; B66B 5/0012; B66B 1/463; B66B 2201/103; B66B 2201/4607; B66B 2201/4615; B66B 2201/4638
See application file for complete search history.

(56) References Cited

U.S. PATENT DOCUMENTS

| 4,691,808 A | 9/1987 | Nowak et al. |
|---|---|---|
| 6,109,396 A | 8/2000 | Sirag et al. |

(Continued)

FOREIGN PATENT DOCUMENTS

| CN | 101983169 A | 3/2011 |
|---|---|---|
| CN | 103863911 A | 6/2014 |

(Continued)

OTHER PUBLICATIONS

Search Report for European Application No. 18175753.5; Application Filing Date Jun. 4, 2018; dated Nov. 26, 2018 (9 pages).

(Continued)

*Primary Examiner* — Marlon T Fletcher
(74) *Attorney, Agent, or Firm* — Cantor Colburn LLP

(57) ABSTRACT

An elevator system includes an elevator car drive assembly configured to drive at least one elevator car to a plurality of floors serviced by the elevator system. A mobile electronic device inputs a ride request to deliver an available elevator car among the at least one elevator car to a floor location containing the mobile electronic device. An electronic elevator controller is in signal communication with the elevator drive assembly and the mobile electronic device. The electronic elevator controller is configured to determine an unavailability of an originally assigned elevator car selected to perform the ride request, and to transmit reassignment information to the mobile electronic device indicating modification of the ride request.

12 Claims, 6 Drawing Sheets

(56) References Cited

U.S. PATENT DOCUMENTS

| | | | |
|---|---|---|---|
| 6,202,799 B1 | 3/2001 | Drop | |
| 6,209,685 B1 | 4/2001 | Zaharia et al. | |
| 6,397,976 B1 | 6/2002 | Hale et al. | |
| 7,328,775 B2 | 2/2008 | Zaharia et al. | |
| 7,353,915 B2 | 4/2008 | Zaharia et al. | |
| 7,377,364 B2 | 5/2008 | Tyni | |
| 7,549,517 B2 | 6/2009 | Stanley et al. | |
| 7,921,968 B2 | 4/2011 | Stanley et al. | |
| 7,958,971 B2 | 6/2011 | Mangini et al. | |
| 8,028,806 B2 | 10/2011 | Stanley et al. | |
| 8,047,334 B2 | 11/2011 | Christy et al. | |
| 8,136,636 B2 | 3/2012 | Bahjat et al. | |
| 8,177,036 B2 | 5/2012 | Stanley et al. | |
| 8,348,021 B2 | 1/2013 | Finschi | |
| 8,485,317 B2 | 7/2013 | Gerstenkorn | |
| 8,744,754 B2* | 6/2014 | Kappeler | B66B 1/468 187/391 |
| 8,939,263 B2 | 1/2015 | Tokura | |
| 9,580,272 B2 | 2/2017 | Kappeler | |
| 2006/0144644 A1 | 7/2006 | Chiba | |
| 2008/0236956 A1 | 10/2008 | Finschi | |
| 2009/0002131 A1 | 1/2009 | Rusanen | |
| 2009/0133969 A1* | 5/2009 | Zaharia | B66B 1/462 187/388 |
| 2009/0301820 A1 | 12/2009 | Stanley | |
| 2011/0031070 A1 | 2/2011 | Langer | |
| 2011/0132699 A1 | 6/2011 | Tokura | |
| 2012/0253658 A1* | 10/2012 | Kappeler | B66B 1/468 701/410 |
| 2012/0279807 A1* | 11/2012 | Finschi | B66B 1/2458 187/384 |
| 2012/0279808 A1 | 11/2012 | Terry | |
| 2013/0168190 A1 | 7/2013 | Christy et al. | |
| 2014/0041968 A1* | 2/2014 | Tokura | B66B 1/2458 187/389 |
| 2014/0339023 A1* | 11/2014 | Friedli | B66B 1/2408 187/247 |
| 2015/0034426 A1 | 2/2015 | Armistead | |
| 2015/0045956 A1 | 2/2015 | Joyce et al. | |
| 2015/0090535 A1* | 4/2015 | Nakagawa | B66B 1/2458 187/387 |
| 2016/0009525 A1* | 1/2016 | DePaola | B66B 1/468 187/380 |
| 2016/0031675 A1 | 2/2016 | Silvennoinen | |
| 2016/0122157 A1* | 5/2016 | Keser | B66B 1/468 187/388 |
| 2016/0130112 A1 | 5/2016 | Nikovski | |
| 2016/0130113 A1* | 5/2016 | Tokura | B66B 1/3461 187/382 |
| 2016/0297642 A1 | 10/2016 | Finn | |
| 2016/0304312 A1 | 10/2016 | Thompson | |
| 2016/0325962 A1 | 11/2016 | Wynter | |

FOREIGN PATENT DOCUMENTS

| | | |
|---|---|---|
| CN | 104418186 A | 3/2015 |
| EP | 2261160 A1 | 12/2010 |
| EP | 1779326 B1 | 1/2013 |
| JP | 2014118263 A | 6/2014 |
| KR | 0167199 B1 | 12/1998 |
| WO | 0075062 A1 | 12/2000 |
| WO | 2006022701 A2 | 3/2006 |
| WO | 2006041467 A1 | 4/2006 |
| WO | 2006059983 A2 | 6/2006 |
| WO | 2007046807 A1 | 4/2007 |
| WO | 2013058734 A1 | 4/2013 |
| WO | 2013112134 A1 | 8/2013 |
| WO | 2013191705 A1 | 12/2013 |
| WO | 2014116182 A1 | 7/2014 |
| WO | 16146357 Y | 9/2016 |

OTHER PUBLICATIONS

Office Action for Chinese Patent Application No. 201810568013.7, Application filed Jun. 4, 2018; dated Feb. 3, 2020 (20 pages).

* cited by examiner

REASSIGNMENT OF ELEVATORS FOR MOBILE DEVICE USERS

BACKGROUND

Exemplary embodiments pertain to the art of elevator systems, and more particularly, to elevator control systems associated with destination dispatching.

Destination dispatch control systems are implemented in elevator systems to facilitate elevator car assignments in response to a floor selection input by a user. For example, a destination dispatch control system may provide an elevator car assignment or a list of potential elevator car assignments based on car usage, user demand, and/or a current floor location of the user. Accordingly, destination dispatch control systems may improve elevator system efficiency and decrease user wait times.

Conventional destination dispatch control systems provide a calculated optimal car assignment by analyzing predetermined parameters, sometimes leading to car assignments that are not aligned with a user's preferences at a given time, such as desired car occupancy, wait time, and travel time. At times, one or more elevator cars and/or one or more destination floors may become unavailable. Therefore, a user must be reassigned to the next available elevator car, or must select a different destination floor.

BRIEF DESCRIPTION

At least one non-limiting embodiment includes an elevator system, comprising an elevator car drive assembly configured to drive at least one elevator car to a plurality of floors serviced by the elevator system. A mobile electronic device inputs a ride request to deliver an available elevator car among the at least one elevator car to a floor location containing the mobile electronic device. An electronic elevator controller is in signal communication with the elevator drive assembly and the mobile electronic device. The electronic elevator controller is configured to determine an unavailability of an originally assigned elevator car selected to perform the ride request, and to transmit reassignment information to the mobile electronic device indicating modification of the ride request.

In addition to one or more of the features described above, or as an alternative, the electronic elevator controller automatically reassigns a different elevator car to the mobile electronic device, and transmits the reassignment information to the mobile electronic device such that the mobile electronic device displays an identifier (ID) of the different elevator car.

In addition to one or more of the features described above, or as an alternative, the reassignment information requests the user to manually reinput the ride request, and the electronic elevator controller automatically reassigns a different elevator car to the mobile electronic device in response to the reinput ride request.

In addition to one or more of the features described above, or as an alternative, the mobile electronic device the mobile electronic device displays an identifier (ID) of the different elevator car assigned following the reinput ride request.

In addition to one or more of the features described above, or as an alternative, the elevator controller transmits a push notification command to the mobile electronic device along with the reassignment information, and wherein the mobile electronic device generates at least one of a sound alert, vibration alert, and visual alert in response to receiving the push notification command.

In addition to one or more of the features described above, or as an alternative, the electronic elevator controller is configured to determine an initial elevator car to perform the ride request, and transmits assignment information to the mobile electronic device such that the mobile electronic device displays an ID of the initial elevator car.

In addition to one or more of the features described above, or as an alternative, after determining the initial elevator car is unavailable, the electronic elevator controller transmits the reassignment information to the mobile electronic device such that the ID of the initial elevator car is changed to the ID of the different elevator car.

In addition to one or more of the features described above, or as an alternative, the electronic elevator controller transmits the reassignment information including a request to manually reinput the ride request when a number of automatic elevator car reassignments exceeds a reassignment threshold value.

According to another non-limiting embodiment, a method is provided to control an elevator system. The method includes driving at least one elevator car to a plurality of floors serviced by the elevator system, and inputting, via a mobile electronic device, a ride request to deliver an available elevator car among the at least one elevator car to a floor location containing the mobile electronic device. The method further includes determining, via an electronic elevator controller in signal communication with the elevator drive assembly and the mobile electronic device, an unavailability of an originally assigned elevator car selected to perform the ride request. The method further includes transmitting, via the electronic elevator controller, reassignment information to the mobile electronic device indicating modification of the ride request.

In addition to one or more of the features described above, or as an alternative, the method further includes automatically reassigning, by the electronic elevator controller, a different elevator car to the mobile electronic device, and transmitting the reassignment information to the mobile electronic device such that the mobile electronic device displays an identifier (ID) of the different elevator car.

In addition to one or more of the features described above, or as an alternative, the reassignment information requests the user to manually reinput the ride request, and automatically reassigning, via the electronic elevator controller, a different elevator car to the mobile electronic device in response to the reinput ride request.

In addition to one or more of the features described above, or as an alternative, the mobile electronic device displays an identifier (ID) of the different elevator car assigned following the reinput ride request.

In addition to one or more of the features described above, or as an alternative, the method further includes transmitting, via the elevator controller, a push notification command to the mobile electronic device along with the reassignment information, and wherein the mobile electronic device generates at least one of a sound alert, vibration alert, and visual alert in response to receiving the push notification command.

In addition to one or more of the features described above, or as an alternative, the method further includes determining, via the electronic elevator controller, an initial elevator car to perform the ride request, transmitting the assignment information to the mobile electronic device, and displaying an ID of the initial elevator car on a display screen of the electronic mobile device.

In addition to one or more of the features described above, or as an alternative, the method further includes after determining the initial elevator car is unavailable, transmitting, via the electronic elevator controller, the reassignment information to the mobile electronic device, changing the ID of the initial elevator car on the display screen to the ID of the different elevator car.

In addition to one or more of the features described above, or as an alternative, the method further includes comparing a number of automatic elevator car reassignments performed by the electronic elevator controller to a reassignment threshold value, and transmitting, to the mobile electronic device, reassignment information that includes a request to manually reinput the ride request in response to a number of the automatic elevator car reassignments exceeding the reassignment threshold value.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
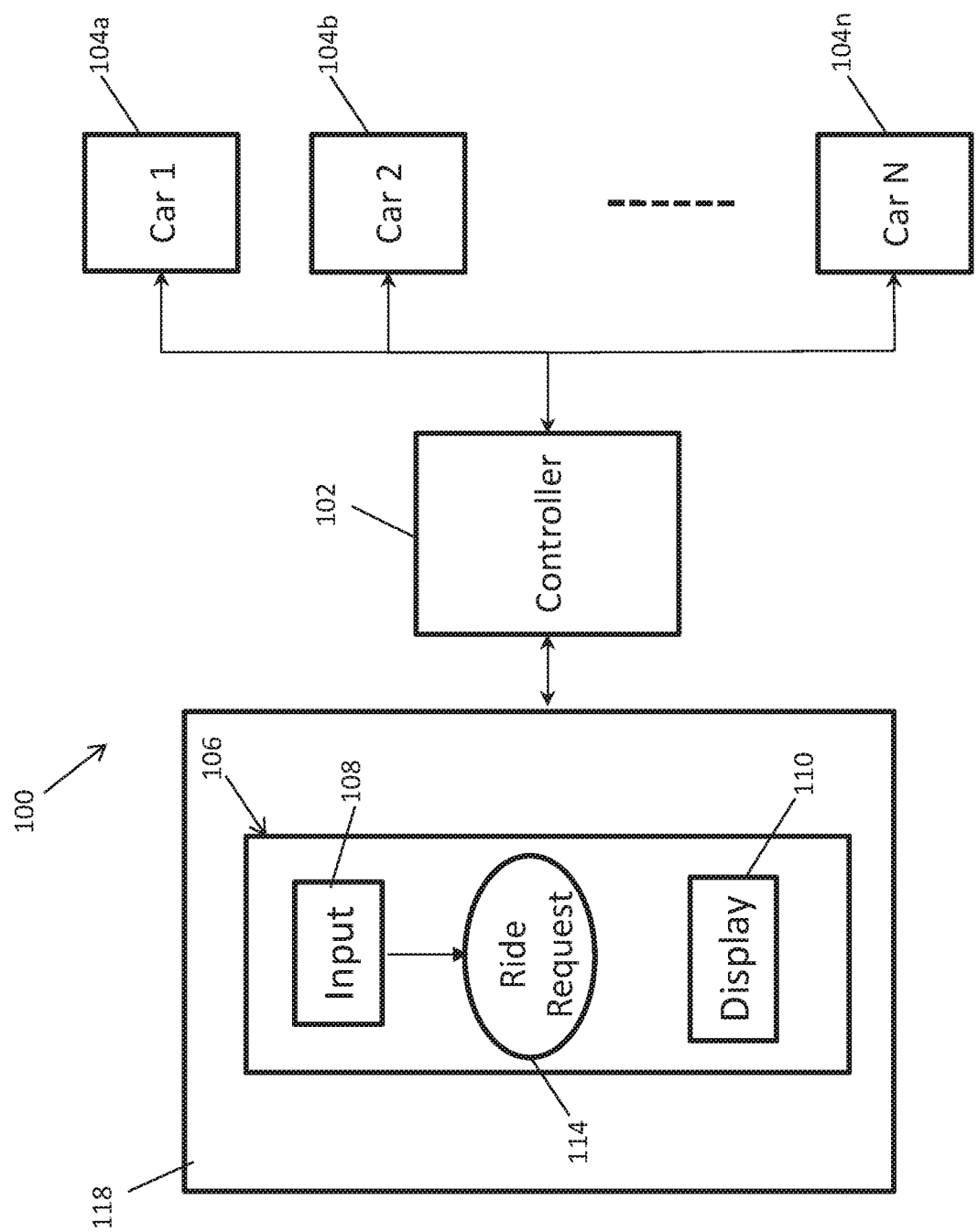
FIG. 1 is a block diagram of an elevator system including a destination dispatch control system according to a non-limiting embodiment.

A detailed description of one or more embodiments of the disclosed apparatus and method are presented herein by way of exemplification and not limitation with reference to the Figures. The following description is merely illustrative in nature and is not intended to limit the present disclosure, its application or uses. It should be understood that throughout the drawings, corresponding reference numerals indicate like or corresponding parts and features.

As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Referring first to an overview of technologies that are more specifically relevant to aspects of various embodiments described herein, the increase in mobile device technologies have provided users with the opportunity to interact with an elevator system using a mobile device such as, for example, a smartphone, smart watch, etc. For example, a user can submit an elevator ride request using a software application (i.e., app) loaded on their personal mobile device. In this manner, the user is not required to wait until a central dispatch unit or dispatch kiosk becomes available before submitting their request. In addition, allowing users to submit a ride request from their personal mobile device decreases waiting lines and foot traffic at the central kiosk unit and/or at individual car request units typically found at each individual floor of a legacy elevator system. When an elevator car becomes unavailable or a destination floor is unavailable, a user must resubmit their ride request.

Turning now to an overview of various features of the present disclosure, one or more non-limiting embodiments provide a dispatch control system that informs a user's mobile device of a subsequent elevator car reassignment and/or unavailable floor. In at least one non-limiting embodiment, a user's mobile device is alerted of an elevator car reassignment when the elevator dispatch control system determines the initially assigned elevator car in unavailable or unable to perform the user's initial ride request. The user can be automatically alerted by forcing the mobile device to emit a sound alert, visual alert (e.g., graphic alert, light emitting alert, etc.) or vibration alert along with displaying the reassigned elevator car on the screen of the mobile device. In this manner, the user is conveniently reassigned to an available elevator car with minimal interaction, if any, between the user and their mobile device.

With reference now to FIG. 1, an elevator system 100 is illustrated according to a non-limiting embodiment. The elevator system 100 includes an electronic elevator controller 102 to provide destination dispatch routing with route selection functionality. Controller 102 also controls the operation of one or more elevator cars 104a-104n. Controller 102 interacts with users via user interface 106.

The user interface 106 allows a user to interface with the elevator system 100. Users may be individual users, such as an employee in a workplace, or a group of users with common preferences, such as employees all working the same shift on the same floor of a building with elevators. In an embodiment, elevator system 100 utilizes destination dispatch routing, which requires destination information before entering a car 104a-104n. In a destination dispatch system, the user selects their desired floor via a user interface 106. In an embodiment, the user interface 106 is a virtual interface to allow a user to enter and receive information using a portable mobile device 118. The portable mobile device 118 includes, but is not limited to, cell phones, tablets, wearable computer devices, smart watches, or other alternative devices. In alternative embodiments, user interface 106 is a physical device that allows alternative interfacing via portable mobile devices 118.

In an embodiment, user interface 106 receives information (ride requests, or other commands) via input 108 for use by controller 102. In an embodiment, input 108 is a physical input, such as a keypad, touch screen, touch pad, mouse, or any other known user input device, to enter ride requests 114. In certain embodiments, input 108 also allows for the identification of users to allow the retrieval of corresponding user profiles. In certain embodiments, input 108 is a virtual input that allows communication from other suitable devices 118, including other mobile devices 118 for example, to allow input of ride requests 114, identification of users and other user inputs. Input commands and ride requests can also be input via a voice recognition system installed on the mobile device 118.

In an embodiment, user interface 106 communicates elevator system 100 outputs via display 110. Display 110 may be a physical display that shows information such as identification confirmation, car assignment, system status, car status, and other relevant information. In certain embodiments, display 110 is a virtual display that outputs information to external devices, such as computers, televisions, external displays and mobile devices 118. In an embodiment, display 110 provides elevator system status information, route options, and allows the user to see their elevator car assignment in accordance with the route selection discussed herein. Audio outputs indicating ride request confirmation can also be generated by the mobile device 118 without requiring the need to generate image alerts or additional information on the display 110.

In an embodiment, a user provides a ride request 114 via input 108. A ride request 114 may include information such as the source floor, destination floor, opening information, and any other suitable information required by the elevator system 100. In certain embodiments, a user can provide a ride request 114 via a physical keypad or otherwise fixed input methods, touchscreen, etc. as part of input 108. In other embodiments, a user can provide a ride request 114 via a mobile device 118.

Once the ride request 114 is received, the controller 102 determines which car 104a-104n that particular ride request 114 should be assigned to, and informs the user at the user interface 106. In an embodiment, the elevator system 100 may provide information via a mobile device 118. In an embodiment, the controller 102 may cause the user interface to provide feedback annunciations and information associated with the dispatched elevator car 104a-104n to the user. In one embodiment, the assigned hoistway and/or car are displayed. In another embodiment, the desired destination, or other information may be displayed on display 110, however other forms of informing the user of the assigned floor are possible, including additional displays, annunciators, and audible announcements and information provided to the mobile device 118. When the user makes the ride request 114 at the user interface 106 using input 108 the user may continue to enter a second request should the user decide to modify the ride request after elevator car dispatch has occurred.

In general, the controller 102 may receive one or more input signals/corresponding to each elevator car 104a-104n of the elevator system 100 to facilitate elevator system operations. The information includes, but is not limited to, car load, brake status, car door status, car input power, car calling status, service operation mode status, car weight, car position, and car emergency status, and input power status. Based on the information, the controller 102 determines the status of and provides commands to the elevator system 100 and/or the elevator cars 104a-104n included in the elevator system 100. Generally, destination dispatch routing functions in elevator systems 100, need only use a few parameters to determine car assignments for users. Such parameters may include the ride request 114 entered, the current state of cars 104a-104n, and other ride requests 114 entered by other users.

Figure 2:
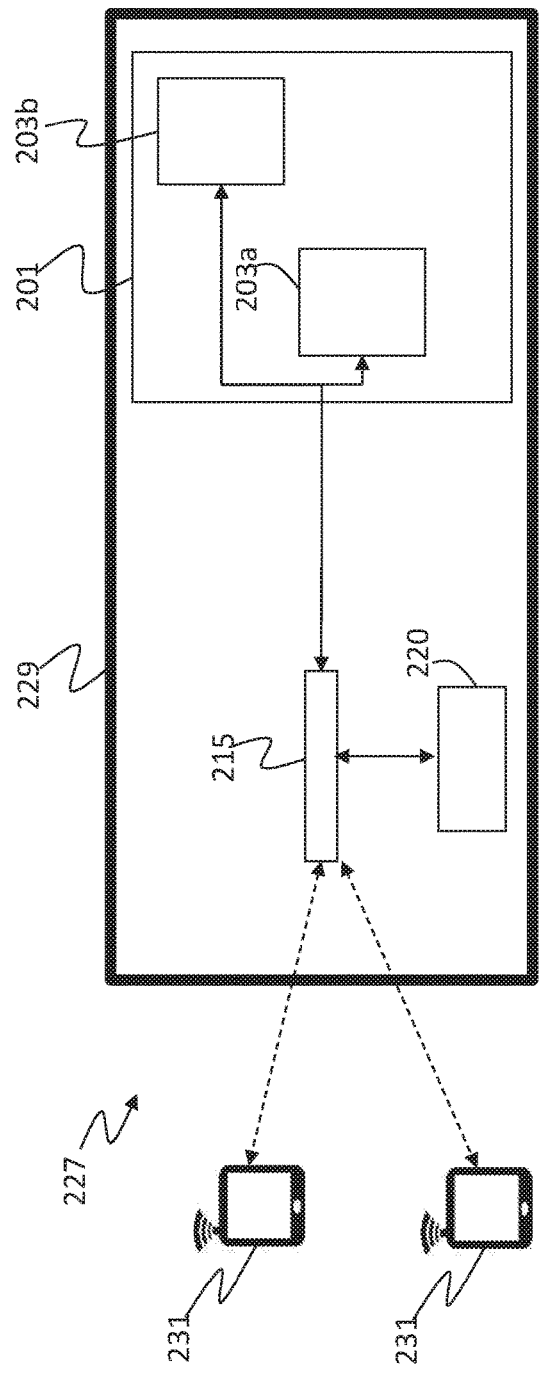
FIG. 2 is a block diagram illustrating a user device in signal communication with a destination dispatch control system in accordance with one or more embodiments of the present disclosure.

Turning now to FIG. 2, an elevator dispatch control system 227 in an example embodiment of the present disclosure is shown. The elevator dispatch control system 227 includes an elevator system 201 installed within a structure 229 (e.g., a building). In some embodiments, the structure 229 may be an office building or a collection of office buildings that may or may not be physically located near each other. The structure 229 may include any number of floors that are accessible by the elevator system 201 and thus the structure 229 can include any number of landings (e.g., as shown in FIG. 1). Persons (i.e., elevator system users) entering the structure 229 may enter at a lobby floor, or any other desired floor, and may travel to a destination floor via one or more elevator cars 203a and 203b that are part of the elevator system 201.

The elevator dispatch control system 227 may include one or more computing devices, such as an elevator controller 215, and an elevator system server 220. The elevator controller 215 may be configured to control dispatching operations of one or more elevator cars 203a-203b installed in the elevator system 201. It is understood that the elevator system 201 may utilize more than one elevator controller 215, and that each elevator controller may control a group of elevator cars 203a-203b. Although two elevator cars 203a-203b are shown in FIG. 2, it should be appreciated that any number of elevator cars may be employed in the elevator system 201 and building systems that employ embodiments of the present disclosure.

The elevator cars 203a-203b can be located in the same hoistway or in different hoistways so as to allow coordination amongst elevator cars 201 in different elevator banks servicing different floors (e.g., sky lobbies, etc.). It should be appreciated that the elevator system 201 may include various features as described above with reference to FIG. 1 and may also include other non-depicted elements and/or features as known in the art. For example, the elevator system 201 can include various machine components configured to drive the elevator cars including, but not limited to, traction components, drive assemblies, drive controller, sheaves, motors, counterweight, ropes, cables, safeties, etc.). The drive controller can determine and store the operating status of one or more particular elevator controllers it controls. In addition, the drive assembly (e.g., drive controller) can include a transceiver that receives and/or transmits electronic data. In this manner, the elevator system 201 can be controlled by the elevator controller 215 when it is remotely located from the machine components.

The elevator cars 203a-203b may be employed in any configuration with all elevators servicing all floors of the building, some elevator cars only servicing certain floors, a first group of elevator cars servicing lower floors of a building and a sky lobby and a second group of elevator cars servicing the sky lobby and upper floors of the building, etc.

Also shown in FIG. 2 is a user device 231, such as a mobile electronic device (e.g., smart phone, smart watch, wearable technology, laptop, tablet, etc.). The user device 231 may include a mobile and/or personal device that is typically carried by a person, such as a phone, PDA, etc. The user device 231 may include an electronic hardware processor, memory, and communication module(s), which is described in greater detail below in relation to FIG. 4A. The processor can be any type or combination of computer processors, such as a microprocessor, microcontroller, digital signal processor, application specific integrated circuit, programmable logic device, and/or field programmable gate array. The memory can be a non-transitory computer readable storage medium tangibly embodied in the user device 231 including executable instructions stored therein, for instance, as firmware. The communication module may implement one or more communication protocols as described in further detail herein, and may include features to enable wireless communication with external and/or remote devices separate from the user device 231. The user device 231 may further include a user interface (e.g., a display screen, a microphone, speakers, input elements such as a keyboard or touch screen, etc.) as known in the art.

The elevator controller 215 may include an electronic hardware computer processor, memory, and a communication module as shown in relation to FIG. 4B described in greater detail below. Similar to the user device 231, the processor memory, and communication module may be implemented as described above, but as part of the elevator system 201. As described above, the elevator controller 215 can establish signal communication with the elevator system 201 to exchange electronic data and/or control signals. Accordingly, the elevator controller 215 can perform various logical computer functions and algorithms to distinguish the elevator cars 203a-203b from another, determine a location of one or more elevator cars 203a-203b, and determine an operating status and/or fault of one or more of the elevator cars 203a-203b.

The elevator system server 220 can store software and/or algorithms to be retrieved by the elevator controller 215. The elevator system server 220 can also store up-to-date information regarding the operating status of the elevator system. For example, the elevator system server 220 can store information indicating the current operating status of one or more elevator cars 203a-203b, the status of one or more floors in the structure 229, the number of user devices 231 connected to the elevator dispatch control system 227 (e.g., in signal communication with a given elevator controller 215), and the detected floor location of one or more of the user devices 231. Although a single elevator system server 220 is illustrated as being installed locally in the elevator dispatch control system 227, it should be appreciated that additional elevator system servers may be employed in the elevator dispatch control system 227 and/or in a cloud server (not shown in FIG. 2).

The elevator dispatch control system 227 is capable of assigning and dispatching an elevator car 203a-203b to a particular user operating a respective user device 231. In at least one non-limiting embodiment, a user located at a given building floor inputs a ride request using an app loaded on their respective user device 231. The elevator controller 215 receives the ride request and also identifies the floor at which the user is located. Based on the ride request and floor location, the elevator controller 215 identifies an elevator car, e.g., 203a, available to provide the ride request, and dispatches the identified elevator car 203a to the user's floor.

In addition, the elevator controller 215 transmits dispatch information, which is displayed on the display screen of the respective user device 231. The dispatch information includes, but is not limited to, the elevator car 203a-203b assigned to the user, the hoistway containing the assigned elevator car 203a-203b, a hallway containing the hoistway, and the destination floor requested by the user. In this manner, a user may conveniently be informed of their ride request without the need to stand in close proximity of a central kiosk, or elevator panel. This may prove to be beneficial in high-rise elevator systems in which users may be required to use multiple elevator cars or hoistways to arrive at their final destination floor. For instance, a user may be required to utilize two different elevator cars to reach their requested final destination. However, the dispatch information received at the user's respective user device 231 frees the user from having to revisit a central kiosk after or wall panel after exiting the first elevator car because the user device 231 can display the second elevator car assigned to complete the ride request.

In at least one non-limiting embodiment, the elevator controller 215 detects a modification in the ride request, and generates reassignment information which is output to the user device 231 to indicate the ride request has been modified. The modification in the ride request can include, but is not limited to, a change in availability of the originally assigned elevator car (e.g., the originally assigned elevator car suddenly becomes unavailable), an operating fault of the originally assigned elevator car, a change in availability to the user's requested destination floor, a passenger evacuation event, a destination floor change request, and a ride request cancellation. For example, when an originally assigned elevator car, e.g., 203a, becomes unavailable (e.g., experiences an operating fault or stoppage), the elevator controller 215 automatically identifies another elevator car, e.g., 203b, available to satisfy the user's original ride request, and reassigns the new elevator car 203b to the user. The elevator controller 215 then automatically outputs the reassignment information to the user's mobile device 231, which in turn displays the reassignment information (e.g., the newly assigned elevator car 203b) on the display screen. In response to receiving the reassignment information, the user's mobile device 231 can also generate a dispatch notification that alerts the user that the original dispatch and assignment information has changed. The dispatch notification can also include, but is not limited to, a sound, a vibration, and an emitted light.

According to at least one non-limiting embodiment, the elevator controller 215 can output a manual reassignment request based on a number of automatic reassignment attempts. For example, the elevator controller 215 can output the manual reassignment request to the user device 231 and request the user to reinput their ride request when a number of automatic reassignment attempts performed by the elevator controller 215 exceeds a reassignment threshold value. For example, the elevator controller 215 can output the manual reassignment request after two sequential automatic reassignment attempt failures occur. The reassignment threshold value can be manually set by a technician, for example, and stored in the elevator server 220.

In at least one embodiment, the reassignment information can be generated in response to a reassignment request that is manually input to the user device 231 by a respective user. For example, instead of automatically generating the reassignment information when detecting that the originally assigned elevator car 203a has become unavailable as described above, the elevator controller 215 first outputs the dispatch notification to alert the user that original dispatch and assignment information has changed. The user can then either manually input a request for a reassigned elevator car, or can choose to cancel the pending ride request all together. In this manner, the elevator controller 215 does not reassign a new elevator car to a user that changes their decision and walks away from the elevator landing while the elevator controller 215 is in the processes of completing the elevator car reassignment.

In another example, the elevator controller 215 may determine that the input destination floor is unavailable. For example, the input destination floor may be under repair, may be reserved for a loading/unloading event, etc. Accordingly, the elevator controller 215 outputs the dispatch notification to alert the user that the input destination floor is unavailable and requests the user to input a new destination floor. The user can then either input a new destination floor, or can choose to cancel the pending ride request all together. When the new destination floor is input, the elevator controller 215 automatically outputs the reassignment information to the user's mobile device 231, which in turn displays the reassignment information (e.g., the assigned elevator car 203 and the newly input destination floor) on the display screen.

Figure 3:
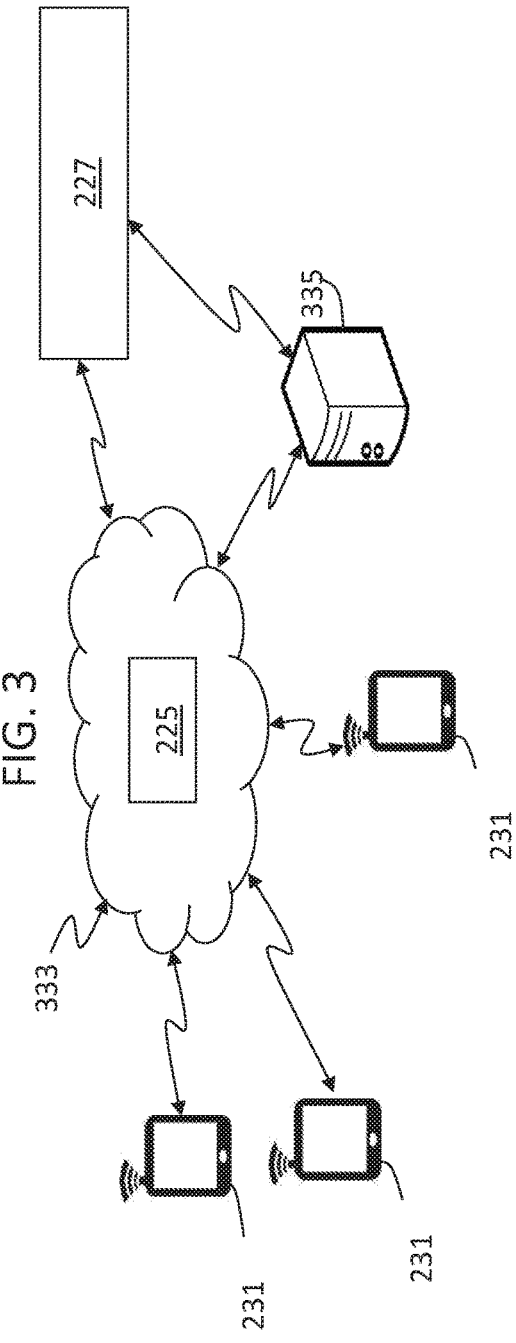
FIG. 3 is a block diagram illustrating a communication network that establishes signal communication between various user devices and an elevator destination dispatch control system according to a non-limiting embodiment.

A user device 231 and an elevator controller 215 in accordance with embodiments of the present disclosure can communicate with one another via a communication network 333 as illustrated in FIG. 3. For example, one or more user devices 231 can communicate with the elevator dispatch control system 227 via the network 333. One or more of the user devices 231 can also communicate with one another when proximate to one another (e.g., within a threshold distance) via the network 333. The network 333 may be wired and/or wireless. Wireless communication network 333 can include, but is not limited to, Wi-Fi, short-range radio (e.g., Bluetooth®), near-field infrared, cellular network, etc.

In some embodiments, the dispatch control system 227 may include, or be associated with (e.g., communicatively coupled to) an elevator controller (e.g., 215 shown in FIG. 2), and one or more networked building elements 335 such as computers, kiosks, beacons, hall call fixtures, lanterns, bridges, routers, network nodes, etc. The networked building element 335 may also communicate directly or indirectly with the user devices 231 using one or more communication protocols or standards (e.g., through the network 333).

For example, the networked building element 335 may communicate with the user devices 231 using Bluetooth® Low Energy (BLE) technology, for example, and thus enable communication between the user devices 231 and the dispatch control system 227. In some embodiments, the delivery dispatch control system 227 may establish communication with one or more user devices 231 that are outside of the structure/building. A more specific location of a given user device 231 can be determined using various techniques including, but not limited to, exchanging Global Positioning System (GPS) data, performing triangulation techniques, or signal strength detection, by way of non-limiting examples. Such technologies that allow communication can provide users and the system(s) described herein more time to perform the described functions. In example embodiments, the user devices 231 communicate with the delivery dispatch control system 227 over multiple independent wired and/or wireless networks. Embodiments are intended to cover a wide variety of types of communication between the user devices 231 and the delivery dispatch control system 227, and embodiments are not limited to the examples provided in this disclosure.

The network 333 may be any type of known communication network including, but not limited to, a wide area network (WAN), a local area network (LAN), a global network (e.g. Internet), a virtual private network (VPN), a cloud network, and an intranet. The network 333 may be implemented using a wireless network or any kind of physical network implementation known in the art. The user devices 231 and/or the networked devices 335 may be coupled to the dispatch control system 227 through multiple networks 333 (e.g., cellular and Internet) so that not all user devices 231 and/or the networked devices 335 are coupled to the dispatch control system 227 through the same network 333. One or more of the user devices 231 and the dispatch control system 227 can be connected to the network 333 in a wireless fashion. In one non-limiting embodiment, the network 333 is the Internet and one or more of the user devices 231 execute a user interface application (e.g. a web browser) to contact the dispatch control system 227 through the network 333. The network 333 may also include a cloud-computing network that includes a cloud server 225 configured to perform one or more functions of the elevator system server 220 described above.

In some embodiments, a request for elevator service may be communicated over one or more lines, connections, or networks, such as network 333, e.g., a request made by a user device 231 and transmitted through the network 333 to the dispatch control system 227 to request elevator service. The request for service may be initiated by a mobile device controlled by and/or associated with a user, in a passive or active manner. In some embodiments, the mobile device may be operative in conjunction with a Transmission Control Protocol (TCP) and/or a User Datagram Protocol (UDP). In some embodiments, a request for service may be authenticated or validated based on a location of the user device. In some embodiments, a request for service may be fulfilled in accordance with one or more profiles, such as one or more user or mobile device profiles. In some embodiments the profiles may be registered as part of a registration process. In some embodiments, an elevator system may be registered with a service provider.

As noted, the dispatch control system 227 may be associated with an elevator system (e.g., elevator systems 101, 201). The delivery dispatch control system 227 may be used to process or fulfill the requests for elevator service that are submitted from one or more user devices 231. The requests for elevator service may be received through the network 333 from the one or more user devices 231 and/or the networked building elements 335, which may be mobile devices, including, but not limited to phones, laptops, tablets, smartwatches, etc. One or more of the user devices 231 may be associated with (e.g., owned by) a particular user. The user may use his/her user device(s) 231 to request elevator service.

For example, a user of a user device 231 may request service in an affirmative or active manner. The user may enter a request for elevator service using an I/O interface of the user device 231, as described herein. That is, in some embodiments, an application, app, or other program may be installed and operated on the user device 231 wherein the user may interact with the app or program to request elevator service.

In other embodiments, or in combination therewith, the user may request elevator service in a passive manner. For example, a profile may be established for the user or the particular user device 231, optionally as part of a registration process with, e.g., a service provider and/or through historical data tracking. The profile may contain a log of the user's history and/or activities, such as where the user has gone or traveled to, the user's preferences, or any other data that may be applicable to the user. In some embodiments, the user profile may be accessed or analyzed to determine the likelihood or probability that the user will request elevator service at a particular moment in time (e.g., a particular day or time of day). Resources may be provisioned or allocated to fulfill the request (e.g., an elevator car call or reservation may be placed) in the event that the probability of requested service, or consumption, or use of an elevator is anticipated.

The request for service may be conveyed or transmitted from the user device 231 through the network 333. For example, the request for service may be transmitted to and/or over the Internet and/or a cellular network. The network(s) 333 may include infrastructure that may be organized to facilitate cloud computing. For example, one or more servers, such as a primary message server, a backup message server, and a device commissioning message server may be employed as part of the network 333.

In some embodiments, the request for service may specify a type of ride requested, at any level of detail or abstraction. For example, a first request for service may specify that elevator service is requested, a second request for service may specify one or more of a departure floor and/or a destination floor, and a third request for service may specify that elevator service is desired to accommodate a heavy load (e.g., freight or cargo) with a number of other users or passengers in an amount less than a threshold. In some embodiments, the request for service transmitted from the user device 231 may include an identifier associated with the user or the particular user device 231 in order to allow the dispatch control system 227 to distinguish between users and/or user devices 231.

Figure 4A:
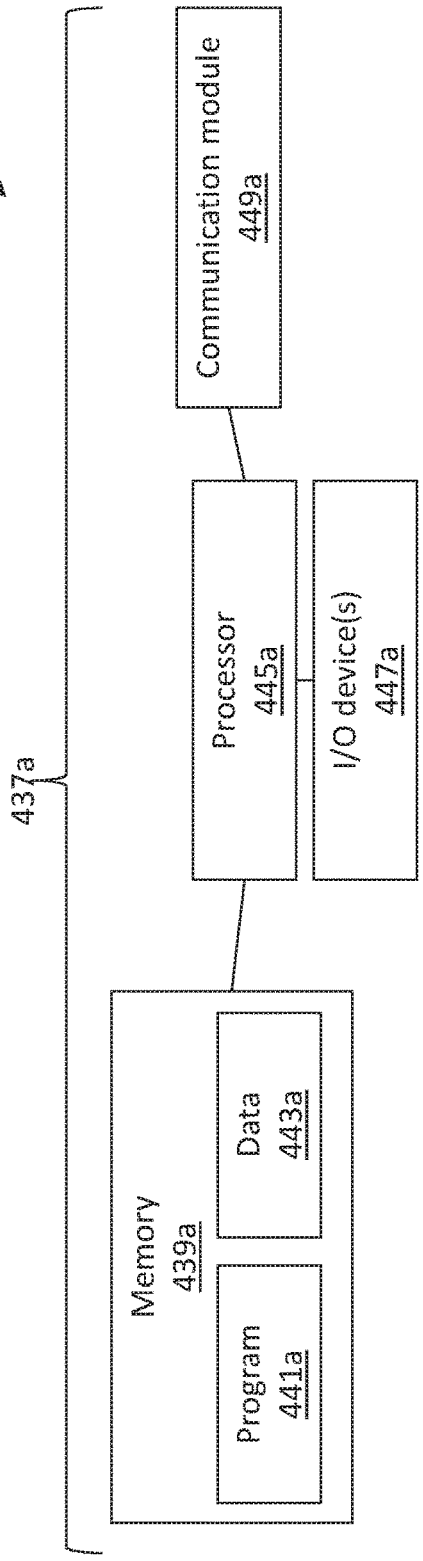
FIG. 4A is a block diagram illustrating a computing system of a user device in accordance with a non-limiting embodiment of the present disclosure.
Figure 4B:
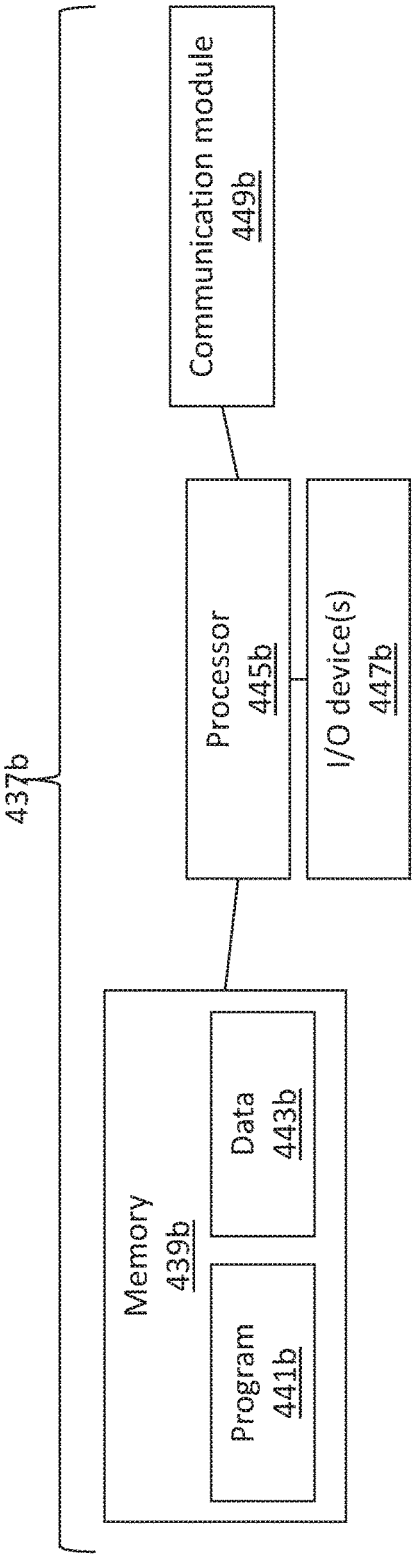
FIG. 4B is a block diagram illustrating a computing system of an elevator controller included in a destination dispatch control system in accordance with a non-limiting embodiment of the present disclosure.

Referring now to FIGS. 4A-4B, schematic block diagram illustrations of example computing systems 437a, 437b for a user device 431 and an elevator controller 415, respectively, are shown. The user device computing system 437a may be representative of computing elements or components of user devices 431, networked elements, mobile devices, etc., as employed in embodiments of the present disclosure. The elevator controller computing system 437b may be representative of computing elements or components of controllers, elevator controller, networked elements, computers, etc., of an example, elevator controller 415. For example, the computing system 437a can be configured as part of a user device 431, e.g., user device 231 shown above. The computing system 437a can be configured to operate the user device 431, including, but not limited to, operating and controlling a touch-screen display to display various output and receive various input from a user's interaction with the touch-screen display. The computing system 437b can be configured as part of the dispatch control system 227, which can include the elevator controllers 115 and 215, as described above. The computing system 437b can be a computer or other type of controller that is physically connected or remote from mechanical control of the elevator system. The computing system 437b may be connected to various elements and components within a building that are associated with operation of an elevator system.

As shown, the computing system 437a includes a memory 439a which may store executable instructions and/or data. The executable instructions may be stored or organized in any manner and at any level of abstraction, such as in connection with one or more applications, apps, programs, processes, routines, procedures, methods, etc. As an example, at least a portion of the instructions are shown in FIG. 4A as being associated with a program 441a. The memory 439a can include RAM and/or ROM and can store the program 441a thereon, wherein the program 441a may be a mobile operating system and/or mobile applications to be used on the user device 431.

Further, the memory 439a may store data 443a. The data 443a may include profile or registration data (e.g., in a user device), a device identifier, or any other type(s) of data. The executable instructions stored in the memory 439a may be executed by one or more processors, such as a processor 445a, which may be a mobile processor in the user device 431. The processor 445a may be operative on the data 443a and/or configured to execute the program 441a. In some embodiments, the executable instructions can be performed using a combination of the processor 445a and remote resources (e.g., data and/or programs stored in the cloud (e.g., remote servers)).

The processor 445a may be coupled to one or more input/output (I/O) devices 447a. In some embodiments, the I/O device(s) 447a may include one or more of a physical keyboard or keypad, a touchscreen or touch panel, a display screen, a microphone, a speaker, a mouse, a button, e.g., parts or features of a telephone or mobile device (e.g., a smartphone. For example, the I/O device(s) 447a may be configured to provide an interface to allow a user to interact with the user device 431. In some embodiments, the I/O device(s) 447a may support a graphical user interface (GUI) and/or voice-to-text capabilities for the user device 431.

The components of the computing system 437a may be operably and/or communicably connected by one or more buses. The computing system 437a may further include other features or components as known in the art. For example, the computing system 437a may include one or more communication modules 449a, e.g., transceivers and/or devices configured to receive information or data from sources external to the computing system 437a. In one non-limiting embodiments, the communication modules 449a of the user device 431 can include a near-field communication chip, a BLE chip, a Wi-Fi chip, etc., and a cellular data chip, as known in the art. In some embodiments, the computing system 437a may be configured to receive information over a network (wired or wireless), such as network 333 shown in FIG. 3. The information received over the network may be stored in the memory 439a (e.g., as data 443a) and/or may be processed and/or employed by one or more programs or applications (e.g., program 441a).

The computing systems 437a may be used to execute or perform embodiments and/or processes described herein, such as within and/or on user devices. For example, the computing system 437a of the user device 431 enables a user interface to enable a user to make ride requests to an elevator. To make such ride requests, the user device 431, and the computing system 437a thereof, may communicate with the computing system 437b of the elevator controller 415.

For example, as shown in FIG. 4B, the elevator controller 415 includes a computing system 437b that is used to receive commands and/or instructions (e.g., data) from remote devices, including, but not limited to, the user device 431. The computing system 437b is configured to control operation of and/or reservation of elevator cars within one or more elevator hoistways. The computing system 437b (and program 439b stored thereon) may be configured to process requests for an elevator ride received from one or more user devices (e.g., user device 431). As part of the processing, the computing system 437b may validate or authenticate the user device 437 such that only certain user devices 431 may be able to communicate and/or make elevator ride requests to the elevator controller 415.

As shown, the computing system 437b of the elevator controller 415 includes components similar to that shown and described with respect to the computing system 437a of FIG. 4A. As such, the elevator controller computing system 437b includes a memory 439b with at least one program 441b and data 443b stored thereon. The data 443b may include profile or registration data (e.g., related to user devices), elevator car data, elevator control data and/or programs, or any other type(s) of data associated with control and/or operation of an elevator system. A processor 445b may be configured to receive ride requests through a communication module 449b from one or more user devices 431. The computing system 437b may further include one or more I/O devices 447b, including, but not limited to, control connections to one or more elevator mechanical controls and/or elevator cars. Further, in some configurations, the I/O devices 447b can include a monitor or display screen as part of a user interactive computing system that is associated with the elevator system and/or elevator controller 415.

Turning now to FIGS. 5A-5D, various illustrations of a graphical user interface (GUI) 500 implemented on a user device 510 (comparable to 231, 431) in accordance with several non-limiting embodiments of the present disclosure are shown. Although the user device 510 is illustrated as a mobile phone, the GUI can be implemented with other types of user devices including, but not limited to, wearable devices, a smart watch, a computer laptop, and a computer tablet.

As shown in FIGS. 5A-5D, a screen 502 of a user device 510 may display the GUI 500 that represents a screen or interface of an application in accordance with an embodiment of the present disclosure. The GUI 500 can enable a user to submit an elevator ride request by operation and interaction with the GUI 500 displayed on the screen 502. That is, the GUI 500 can enable a user device 510 to communicate with an elevator controller (not shown in FIGS. 5A-5D) to submit an elevator ride request. It should be appreciated that the GUI 500 can transition between several different graphical displays from the time the user inputs their initial ride request to time the ride is completed.

Figure 5B:
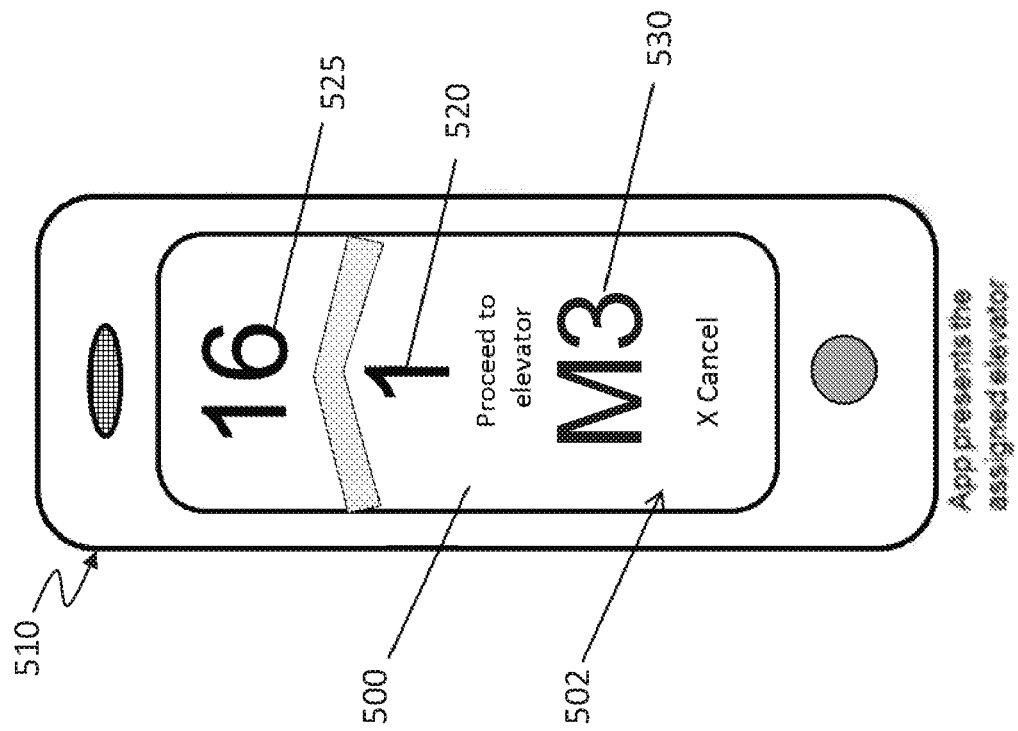
FIGS. 5A-5D illustrate various graphical user interfaces (GUIs) presented on the display screen of a user device according to non-limiting embodiments of the present disclosure.
Figure 5A:
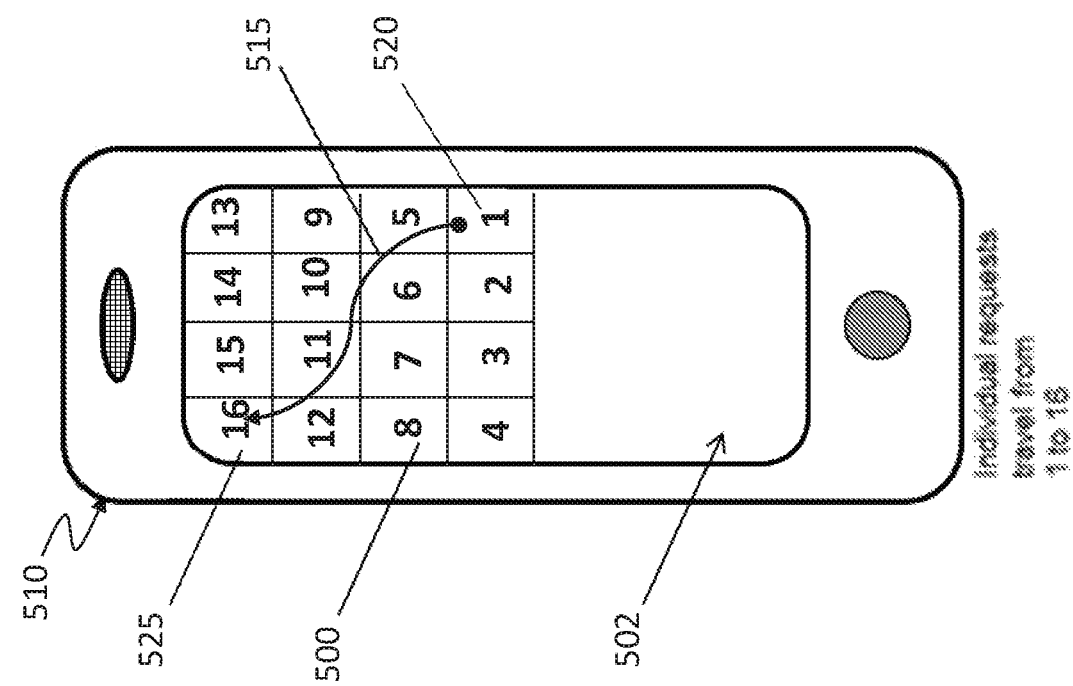

Turning to FIG. 5A, the user device 510 is shown displaying a GUI 500 that allows a user to input an initial ride request. In this example, the user device 510 includes a touch screen that allows the user to drag their finger (as indicated by swipe path 515) from their current floor location 520 to a desired destination floor 525. It should be appreciated that the destination input method described above is only one example for inputting a destination floor, and that any method for indicating a desired destination floor can be implemented without departing from the scope of the invention.

Referring to FIG. 5B, the GUI 500 transitions to an interface that displays the initial assignment information exchanged between the elevator controller (not shown in FIGS. 5A-5D) and the mobile device 510. At this stage, the GUI 500 confirms the ride request to travel from the current floor location 520 to the input floor destination 525. Accordingly, the user can easily identify whether the correct destination floor 525 was previously entered correctly and may cancel the pending ride request if the displayed destination floor 525 is incorrect. In addition, the GUI 500 displays assignment information 530 such as, for example, the particular elevator car (e.g. M3) currently assigned to the user. In this manner, the user can proceed directly to the landing associated with the assigned elevator car. Although the assignment information illustrated in FIG. 5B shows a single car assignment M3, it should be appreciated that additional car assignments necessary to complete the user's ride request can be displayed.

Figure 5C:
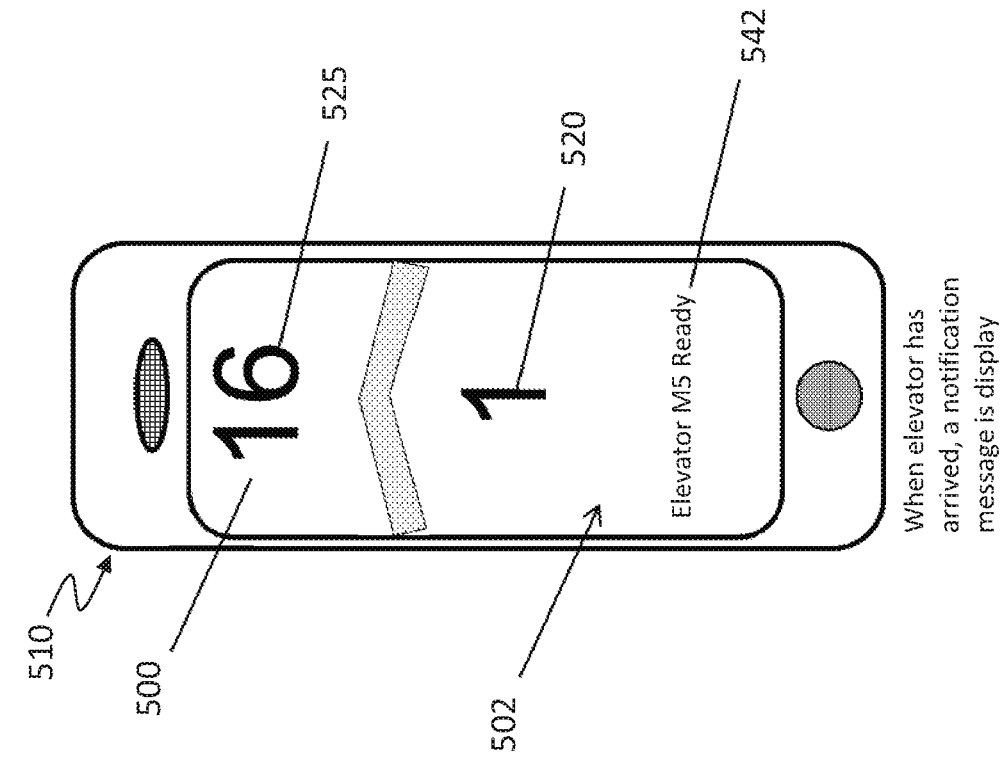

Referring to FIG. 5C, the user device 510 is illustrated generating a dispatch notification alert 535 in response to receiving reassignment information 540 indicating a change in the initial ride request. In this case, for example, the originally assigned elevator car (e.g., M3) has become unavailable. Accordingly, the elevator controller determined a new elevator car (M5) to perform the ride request and transmitted the reassignment information to the user device 510. In response to receiving the reassignment information, the user device 510 generates the dispatch notification alert 535 (e.g., sound, vibration, light, etc.), and displays the reassigned elevator car (e.g., M5) on the screen 502.

Figure 5D:
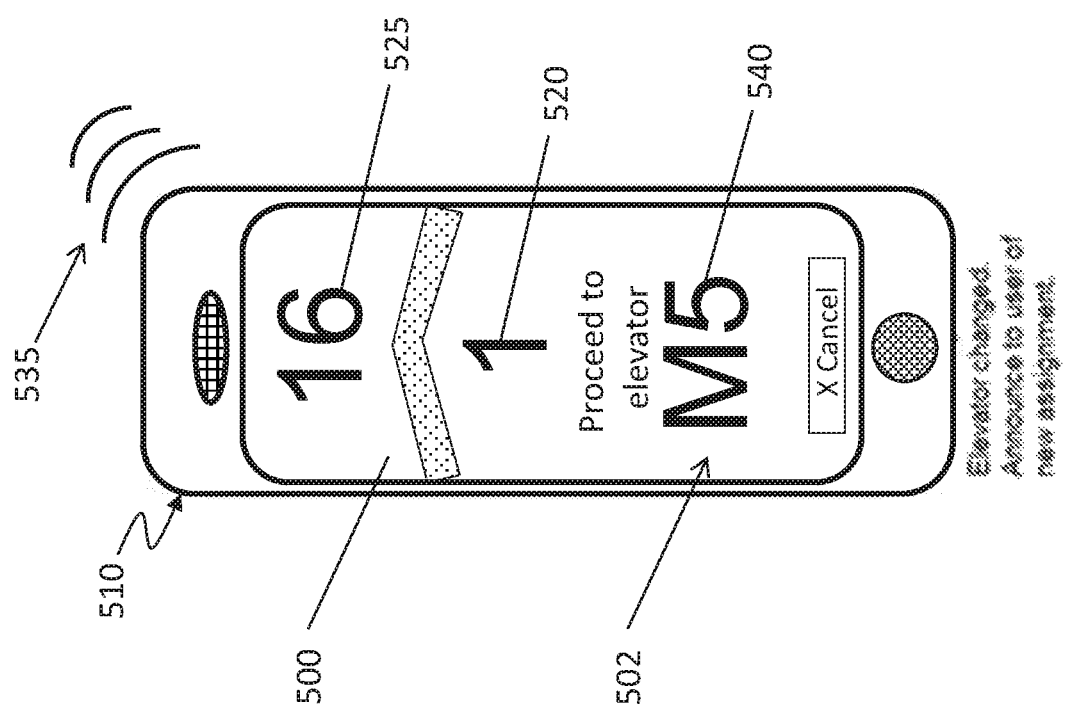

Referring now to FIG. 5D, the GUI 500 transitions to an interface that displays ride status data 542 which informs the user that the reassigned elevator (e.g., M5) has arrived at the landing. Accordingly, the user can conveniently be notified of a change in the initial ride request, and can proceed to a reassigned elevator car (e.g., M5) without being forced to revisit a central kiosk or common landing interface.

Figure 6:
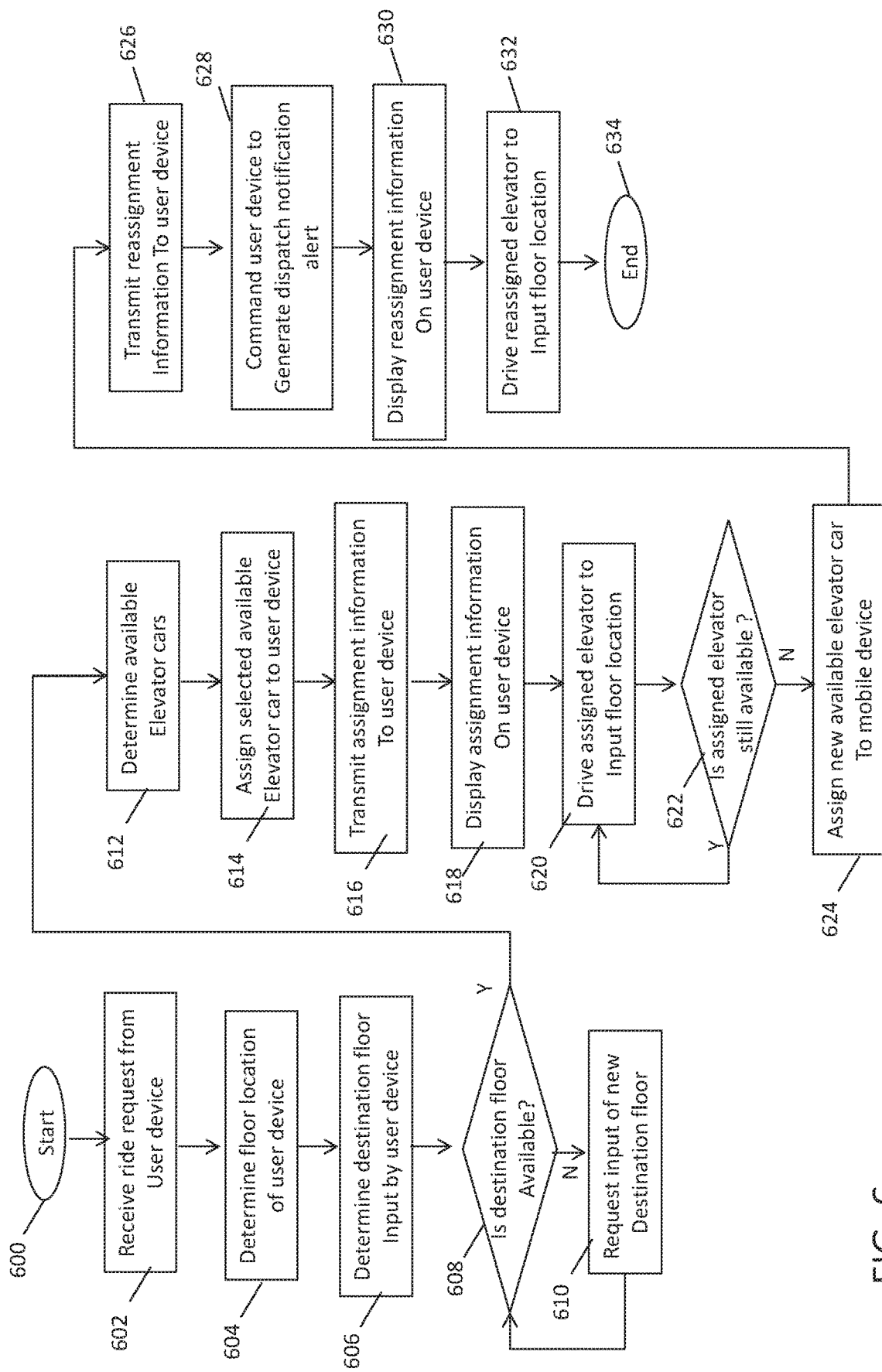
FIG. 6 is flow diagram illustrating a method of assigning and dispatching an elevator car based on a ride request received from a mobile user device according to a non-limiting embodiment.

With reference now to FIG. 6, a flow diagram illustrates a method of assigning and dispatching an elevator car based on a ride request received from a mobile user device according to a non-limiting embodiment. The method begins at operation 600, and at operation a ride request is received from a user device. In at least one embodiment, the ride request is received from a user that inputs the ride request using a mobile electronic device such as, for example, a smartphone, tablet computer, laptop computer, wearable computing device, smart watch, etc. At operation 604, a floor location of the mobile device, and thus the user, is determined. The floor location can be determined based on a submitted floor location input by the user via the user device. At operation 606, a destination floor is determined. The floor location can be determined in various manners including, for example, based on a submitted destination floor location input by the user via the user device, or automatically determined based on an automatic passenger detection and location system. At operation 608, a determination is made as to whether the input destination floor is available. For example, the input destination floor may be under construction, or may be reserved for a loading/unloading event such that the destination floor is deemed unavailable to complete the input ride request. When the input destination floor is unavailable, a request is delivered to the user to device to input a new destination floor at operation 610, and the operation returns to operation 608 to determine if the newly input destination floor is available.

When the input destination floor is available at operation 608, the operation proceeds to operation 612 and an elevator car available to perform the ride request is determined at operation. At operation 614, the available elevator car is assigned to the user device that submitted the ride request. At operation 616, assignment information is generated and transmitted to the user device. The assignment information includes, but is not limited to, the input floor location, the input destination floor, and an elevator car identifier (ID). At operation 618, the assignment information is received and displayed by the user device. At operation 620, the assigned elevator is driven to the input floor location. At operation 622, a determination is made as to whether the assigned elevator car is still available. For example, the assigned elevator car may become disabled before reaching the input floor location. When the assigned elevator car is available, the method returns to operation 620 and continues driving the assigned elevator car to input floor location. Although not illustrated, it should be appreciated that the method may continue monitoring the availability of the assigned elevator car until the car ultimately reaches the input floor location.

When, however, the elevator car is unavailable at operation 622, a new elevator car that is available to perform the original ride request is determined and assigned to the user device at operation 624. At operation 626, reassignment information is generated and transmitted to the user device. The reassignment information includes, but is not limited to, an ID of the reassigned elevator car. At operation 628, a push notification is transmitted to the user device, which forces or commands the user device to generate a dispatch notification alert. The dispatch notification alert includes, for example, a sound, vibration, or light which indicates alerts the user that the original assignment information has been modified. At operation 630, the user device displays the reassignment information on the display screen. Accordingly, the display screen may change the original assigned elevator car ID to the reassigned elevator car ID. At operation, the reassigned elevator car 632 is driven to the input floor location, and the method ends at operation 634. Although not illustrated, it should be appreciated that additional operations can be included in the flow diagram without departing from the scope of the invention. For example, the availability of the reassigned elevator car can be monitored until it successfully reaches the input floor location, in a similar manner as described in operations 620-624.

As described above, various non-limiting embodiments address the shortcomings of the conventional dispatch control systems by providing an elevator system that includes a dispatch control system capable of determining when an elevator car assigned to a user become unavailable to perform user's original ride request. The elevator dispatch control system operates in conjunction with a user's mobile device to inform the user of a subsequent elevator car reassignment and/or unavailable floor. In one example, the dispatch control system automatically transmits reassignment information identifying the reassigned elevator car to the user device, which is then displayed on user device screen. The user's mobile device can also be alerted of the elevator car reassignment when the elevator dispatch control system automatically reassigns a new elevator car to the user. In this manner, the user is conveniently reassigned to an available elevator car capable of completing the ride request with minimal interaction, if any, between the user and their mobile device.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An elevator system, comprising:
    an elevator car drive assembly configured to drive at least one elevator car to a plurality of floors serviced by the elevator system;
    a mobile electronic device that inputs a ride request to deliver an available elevator car among the at least one elevator car to a floor location containing the mobile electronic device; and
    an electronic elevator controller in signal communication with the elevator drive assembly and the mobile electronic device, the electronic elevator controller configured to determine an unavailability of an originally assigned elevator car selected to perform the ride request, and to transmit reassignment information to the mobile electronic device indicating modification of the ride request,
    wherein the electronic elevator controller automatically reassigns a different elevator car to the mobile electronic device, and transmits the reassignment information to the mobile electronic device such that the mobile electronic device displays an identifier (ID) of the different elevator car, and
    wherein the electronic elevator controller transmits the reassignment information including a request to manually reinput the ride request when a number of automatic elevator car reassignments exceeds a reassignment threshold value.

2. The elevator system of claim 1, wherein the reassignment information requests the user to manually reinput the ride request, and the electronic elevator controller automatically reassigns a different elevator car to the mobile electronic device in response to the reinput ride request.

3. The elevator system of claim 2, wherein the mobile electronic device the mobile electronic device displays an identifier (ID) of the different elevator car assigned following the reinput ride request.

4. The elevator system of claim 1, wherein the elevator controller transmits a push notification command to the mobile electronic device along with the reassignment information, and wherein the mobile electronic device generates at least one of a sound alert, vibration alert, and visual alert in response to receiving the push notification command.

5. The elevator system of claim 1, wherein the electronic elevator controller is configured to determine an initial elevator car to perform the ride request, and transmits assignment information to the mobile electronic device such that the mobile electronic device displays an ID of the initial elevator car.

6. The elevator system of claim 5, wherein after determining the initial elevator car is unavailable, the electronic elevator controller transmits the reassignment information to the mobile electronic device such that the ID of the initial elevator car is changed to the ID of the different elevator car.

7. A method of controlling an elevator system, the method comprising:
    driving at least one elevator car to a plurality of floors serviced by the elevator system;
    inputting, via a mobile electronic device, a ride request to deliver an available elevator car among the at least one elevator car to a floor location containing the mobile electronic device; and
    determining, via an electronic elevator controller in signal communication with the elevator drive assembly and the mobile electronic device, an unavailability of an originally assigned elevator car selected to perform the ride request, and transmitting, via the electronic elevator controller, reassignment information to the mobile electronic device indicating modification of the ride request;
    automatically reassigning, by the electronic elevator controller, a different elevator car to the mobile electronic device, and transmitting the reassignment information to the mobile electronic device such that the mobile electronic device displays an identifier (ID) of the different elevator car;

comparing a number of automatic elevator car reassignments performed by the electronic elevator controller to a reassignment threshold value; and transmitting, to the mobile electronic device, reassignment information that includes a request to manually reinput the ride request in response to a number of the automatic elevator car reassignments exceeding the reassignment threshold value.

8. The method of claim 7, further comprising transmitting the reassignment information to request the user to manually reinput the ride request, and automatically reassigning, via the electronic elevator controller, a different elevator car to the mobile electronic device in response to the reinput ride request.

9. The method of claim 8, wherein the mobile electronic device displays an identifier (ID) of the different elevator car assigned following the reinput ride request.

10. The method of claim 7, further comprising transmitting, via the elevator controller, a push notification command to the mobile electronic device along with the reassignment information, and generating at least one of a sound alert, vibration alert, and visual alert, via the mobile electronic device, in response to receiving the push notification command.

11. The method of claim 7, further comprising:

determining, via the electronic elevator controller, an initial elevator car to perform the ride request;

transmitting the assignment information to the mobile electronic device; and displaying an ID of the initial elevator car on a display screen of the electronic mobile device.

12. The method of claim 11, further comprising:

after determining the initial elevator car is unavailable, transmitting, via the electronic elevator controller, the reassignment information to the mobile electronic device; and changing the ID of the initial elevator car on the display screen to the ID of the different elevator car.

* * * * *